US012371186B2

(12) United States Patent
Nielsen et al.

(10) Patent No.: US 12,371,186 B2
(45) Date of Patent: *Jul. 29, 2025

(54) LIGHTING APPARATUS FOR REMOTE CONTROLLED DEVICE

(71) Applicant: Snap Inc., Santa Monica, CA (US)

(72) Inventors: Simon Saito Nielsen, Beverly Hills, CA (US); Samy Kamkar, West Hollywood, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,030

(22) Filed: Nov. 7, 2023

(65) Prior Publication Data

US 2024/0067356 A1   Feb. 29, 2024

Related U.S. Application Data

(63) Continuation of application No. 17/821,776, filed on Aug. 23, 2022, now Pat. No. 11,987,383, which is a continuation of application No. 16/452,026, filed on Jun. 25, 2019, now Pat. No. 11,427,349, which is a continuation of application No. 15/339,810, filed on Oct. 31, 2016, now Pat. No. 10,370,118.

(60) Provisional application No. 62/249,252, filed on Oct. 31, 2015.

(51) Int. Cl.
*B64D 47/06* (2006.01)
*B64C 39/02* (2023.01)
*G05D 1/00* (2024.01)
*G05D 1/223* (2024.01)
*B64U 30/20* (2023.01)
*B64U 101/24* (2023.01)

(52) U.S. Cl.
CPC .......... *B64D 47/06* (2013.01); *G05D 1/0016* (2013.01); *G05D 1/223* (2024.01); *B64U 30/20* (2023.01); *B64U 2101/24* (2023.01); *B64U 2201/20* (2023.01)

(58) Field of Classification Search
CPC .. B64D 47/06; B64D 2203/00; G05D 1/0016; G05D 1/223; B64U 30/20; B64U 2101/24; B64U 2201/20
See application file for complete search history.

(56) References Cited

U.S. PATENT DOCUMENTS 6,038,295 A    3/2000  Mattes
6,333,726 B1  12/2001  Bettinger
6,819,982 B2  11/2004  Doane
(Continued)

FOREIGN PATENT DOCUMENTS

CA    2887596 A1    7/2015

OTHER PUBLICATIONS

US 10,656,660 B1, 05/2020, Meisenholder et al. (withdrawn)
(Continued)

*Primary Examiner* — Brian P Sweeney
(74) *Attorney, Agent, or Firm* — Schwegman Lundberg & Woessner, P.A.

(57) ABSTRACT

There is a remote control device or drone, which has software and a combination of lights or LED on an lighting ring or apparatus that can move independently of the drone; the drone can be programmed or be reactive to sound or other stimulus to create the effect of writing shapes or words in the air and typically at nighttime against a dark sky.

19 Claims, 7 Drawing Sheets

(56) References Cited

U.S. PATENT DOCUMENTS

| | | |
|---|---|---|
| 6,949,003 B2 | 9/2005 | Hornsby et al. |
| 6,980,909 B2 | 12/2005 | Root et al. |
| 7,173,651 B1 | 2/2007 | Knowles |
| 7,195,200 B2 | 3/2007 | Yamane |
| 7,302,316 B2 | 11/2007 | Beard et al. |
| 7,411,493 B2 | 8/2008 | Smith |
| 7,535,890 B2 | 5/2009 | Rojas |
| 7,542,073 B2 | 6/2009 | Li et al. |
| 7,750,802 B1 | 7/2010 | Parish et al. |
| 7,773,204 B1 | 8/2010 | Nelson |
| 7,973,658 B2 | 7/2011 | Parish et al. |
| 8,099,944 B2 | 1/2012 | Foster et al. |
| 8,109,073 B2 | 2/2012 | Foster et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,291,716 B2 | 10/2012 | Foster et al. |
| 8,332,475 B2 | 12/2012 | Rosen et al. |
| 8,467,133 B2 | 6/2013 | Miller |
| 8,468,244 B2 | 6/2013 | Redlich et al. |
| 8,472,120 B2 | 6/2013 | Border et al. |
| 8,477,425 B2 | 7/2013 | Border et al. |
| 8,482,589 B2 | 7/2013 | Shen et al. |
| 8,488,246 B2 | 7/2013 | Border et al. |
| 8,549,833 B2 | 10/2013 | Hyde et al. |
| 8,596,036 B2 | 12/2013 | Hyde et al. |
| 8,646,720 B2 | 2/2014 | Shaw |
| 8,667,533 B2 | 3/2014 | Apfel et al. |
| 8,718,333 B2 | 5/2014 | Wolf et al. |
| 8,724,622 B2 | 5/2014 | Rojas |
| 8,814,691 B2 | 8/2014 | Haddick et al. |
| 8,854,594 B2 | 10/2014 | Densham et al. |
| 8,857,191 B2 | 10/2014 | Hyde et al. |
| 8,874,677 B2 | 10/2014 | Rosen et al. |
| 8,903,568 B1 | 12/2014 | Wang et al. |
| 8,909,679 B2 | 12/2014 | Root et al. |
| 8,964,298 B2 | 2/2015 | Haddick et al. |
| 8,989,053 B1 | 3/2015 | Skaaksrud et al. |
| 8,995,433 B2 | 3/2015 | Rojas |
| 9,010,261 B2 | 4/2015 | Szydlowski et al. |
| 9,014,661 B2 | 4/2015 | Decharms |
| 9,017,123 B2 | 4/2015 | Szydlowski et al. |
| 9,040,574 B2 | 5/2015 | Wang et al. |
| 9,055,226 B2 | 6/2015 | Densham et al. |
| 9,055,416 B2 | 6/2015 | Rosen et al. |
| 9,061,102 B2 | 6/2015 | Levien et al. |
| 9,097,890 B2 | 8/2015 | Miller et al. |
| 9,097,891 B2 | 8/2015 | Border et al. |
| 9,100,806 B2 | 8/2015 | Rosen et al. |
| 9,100,807 B2 | 8/2015 | Rosen et al. |
| 9,128,281 B2 | 9/2015 | Osterhout et al. |
| 9,129,295 B2 | 9/2015 | Border et al. |
| 9,134,534 B2 | 9/2015 | Border et al. |
| 9,162,753 B1 | 10/2015 | Panto et al. |
| 9,191,776 B2 | 11/2015 | Root et al. |
| 9,204,252 B2 | 12/2015 | Root |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,723,272 B2 | 8/2017 | Lu et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,109,224 B1 * | 10/2018 | Ratti .............. G09G 3/005 |
| 10,140,987 B2 | 11/2018 | Erickson et al. |
| 10,168,700 B2 | 1/2019 | Gordon et al. |
| 10,370,118 B1 | 8/2019 | Nielsen et al. |
| 10,501,180 B2 | 12/2019 | Yu |
| 10,768,639 B1 | 9/2020 | Meisenholder et al. |
| 11,126,206 B2 | 9/2021 | Meisenholder et al. |
| 11,427,349 B1 | 8/2022 | Nielsen et al. |
| 2005/0005025 A1 | 1/2005 | Harville et al. |
| 2007/0250526 A1 | 10/2007 | Hanna |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2014/0254896 A1 | 9/2014 | Zhou et al. |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 | 2/2017 | Liu et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0137125 A1 | 5/2017 | Kales |
| 2017/0177925 A1 | 6/2017 | Volkart |
| 2017/0225796 A1 | 8/2017 | Sun et al. |
| 2017/0228690 A1 | 8/2017 | Kohli |
| 2017/0244937 A1 | 8/2017 | Meier et al. |
| 2017/0320564 A1 | 11/2017 | Kuzikov |
| 2017/0337791 A1 | 11/2017 | Gordon-carroll |
| 2017/0371353 A1 | 12/2017 | Millinger, III |
| 2018/0082682 A1 | 3/2018 | Erickson et al. |
| 2018/0246529 A1 | 8/2018 | Hu et al. |
| 2019/0011921 A1 | 1/2019 | Wang et al. |
| 2020/0241575 A1 | 7/2020 | Meisenholder et al. |
| 2021/0362848 A1 | 11/2021 | Spencer |
| 2021/0382503 A1 | 12/2021 | Meisenholder et al. |
| 2023/0059272 A1 | 2/2023 | Nielsen et al. |

OTHER PUBLICATIONS

"U.S. Appl. No. 15/339,810, Non Final Office Action mailed Sep. 7, 2018", 5 pgs.

"U.S. Appl. No. 15/339,810, Notice of Allowance mailed Mar. 21, 2019", 7 pgs.

"U.S. Appl. No. 15/339,810, Response filed Feb. 7, 2019 to Non Final Office Action mailed Sep. 7, 2018", 7 pgs.

"U.S. Appl. No. 15/339,810, Response filed Jul. 17, 2018 to Restriction Requirement mailed May 16, 2018", 7 pgs.

"U.S. Appl. No. 15/339,810, Restriction Requirement mailed May 16, 2018", 5 pgs.

"U.S. Appl. No. 16/452,026, 312 Amendment filed Jul. 15, 2022", 6 pgs.

"U.S. Appl. No. 16/452,026, Final Office Action mailed Apr. 21, 2021", 14 pgs.

"U.S. Appl. No. 16/452,026, Non Final Office Action mailed Sep. 13, 2021", 12 pgs.

"U.S. Appl. No. 16/452,026, Non Final Office Action mailed Nov. 13, 2020", 16 pgs.

"U.S. Appl. No. 16/452,026, Notice of Allowance mailed Apr. 15, 2022", 8 pgs.

"U.S. Appl. No. 16/452,026, Preliminary Amendment filed Jan. 2, 2020", 7 pgs.

"U.S. Appl. No. 16/452,026, PTO Response to Rule 312 Communication mailed Jul. 27, 2022", 2 pgs.

(56) References Cited

OTHER PUBLICATIONS

"U.S. Appl. No. 16/452,026, Response filed Feb. 28, 2022 to Non Final Office Action mailed Sep. 13, 2021", 10 pgs.
"U.S. Appl. No. 16/452,026, Response filed Apr. 13, 2021 to Non Final Office Action mailed Nov. 13, 2020", 8 pgs.
"U.S. Appl. No. 16/452,026, Response filed Aug. 23, 2021 to Final Office Action mailed Apr. 21, 2021", 11 pages.
"U.S. Appl. No. 17/821,776, Non Final Office Action mailed Mar. 2, 2023", 14 pgs.
"U.S. Appl. No. 17/821,776, Notice of Allowance mailed Jul. 12, 2023", 8 pgs.
"U.S. Appl. No. 17/821,776, Preliminary Amendment filed Jan. 3, 2023", 6 pgs.
"U.S. Appl. No. 17/821,776, Response filed May 31, 2023 to Non Final Office Action mailed Mar. 2, 2023", 9 pgs.
"U.S. Appl. No. 17/821,776, Supplemental Notice of Allowability mailed Jul. 27, 2023", 5 pgs.
Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 2017, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.
U.S. Appl. No. 15/339,810 U.S. Pat. No. 10,370,118, filed Oct. 31, 2016, Lighting Apparatus for Remote Controlled Device.
U.S. Appl. No. 16/452,026 U.S. Pat. No. 11,427,349, filed Jun. 25, 2019, Lighting Apparatus for Remote Controlled Device.
U.S. Appl. No. 17/821,776, filed Aug. 23, 2022, Lighting Apparatus for Remote Controlled Device.

\* cited by examiner

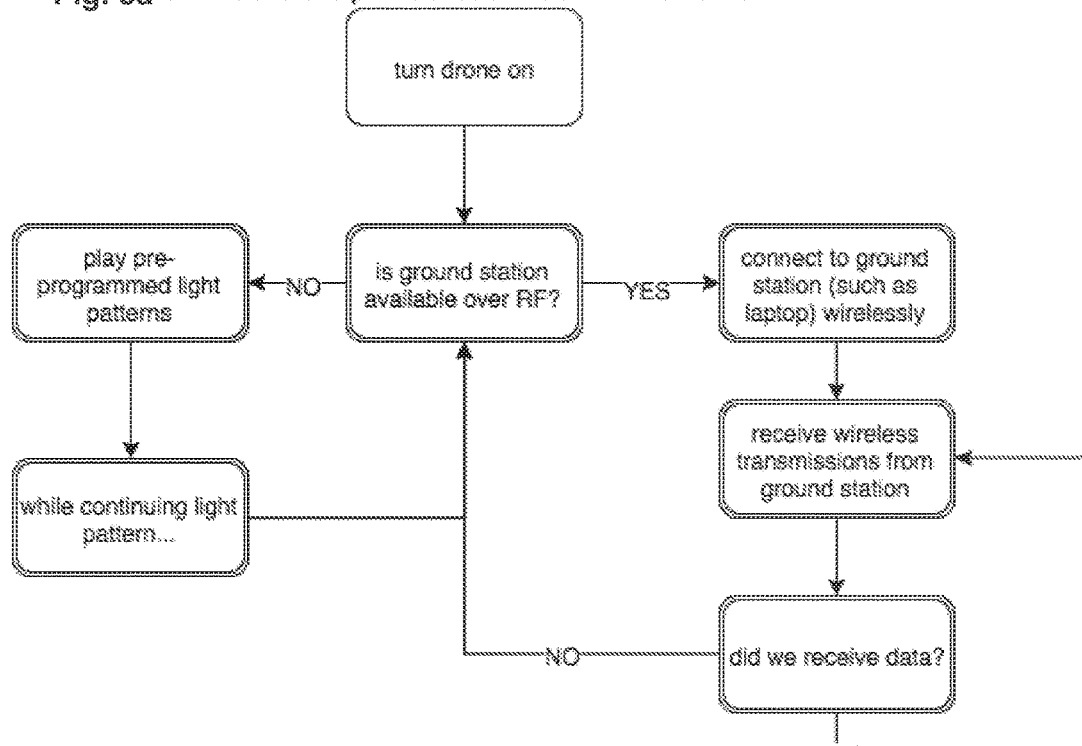
Fig. 5a Outline of drone persistence of vision communication
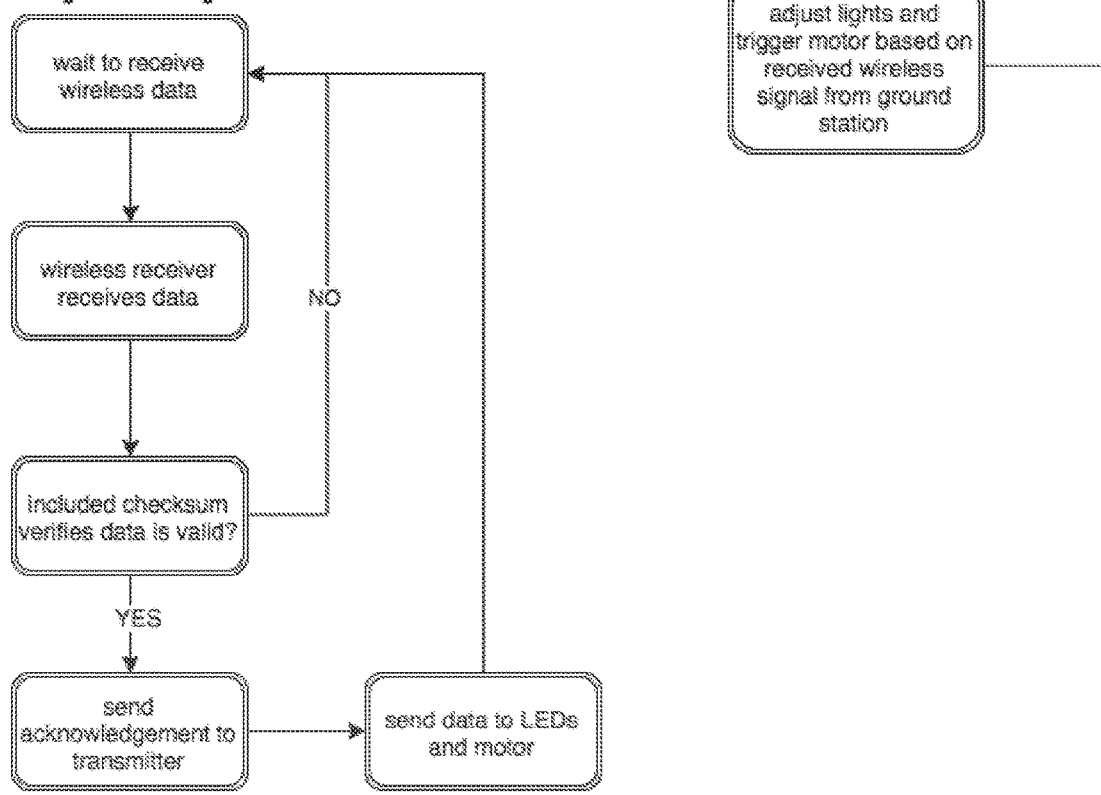
Fig. 5b
Wireless signal handling on drone

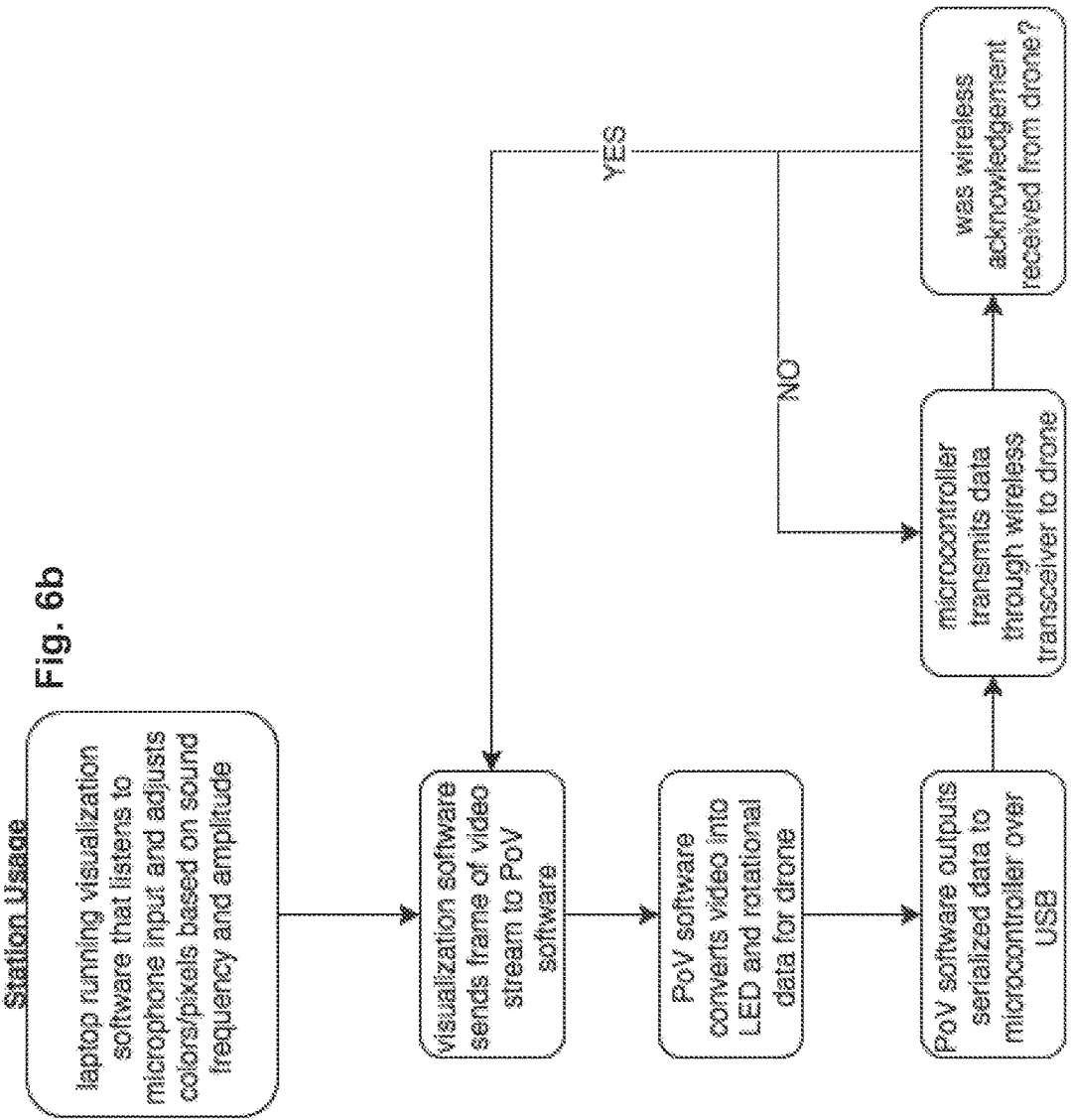
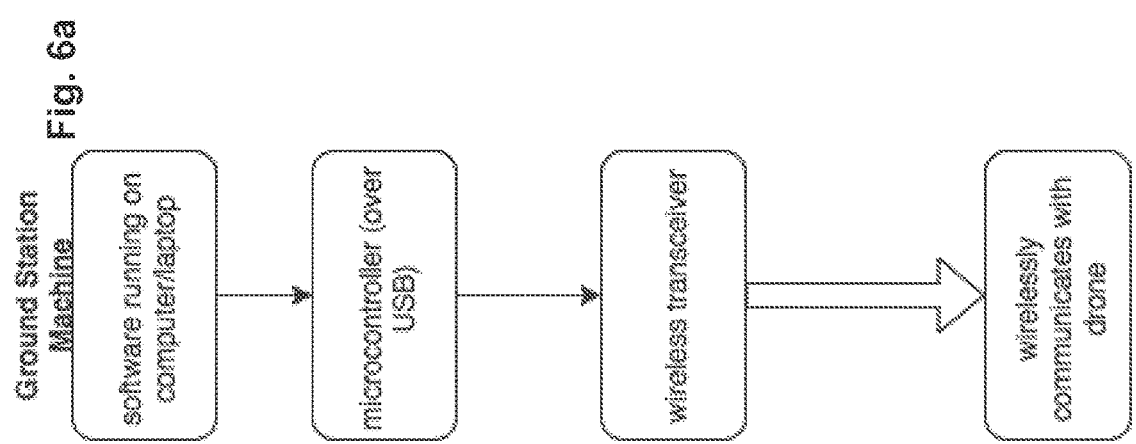

LIGHTING APPARATUS FOR REMOTE CONTROLLED DEVICE

PRIORITY CLAIM

This application is a continuation of U.S. patent application Ser. No. 17/821,776, filed on Aug. 23, 2022, which is a continuation of U.S. patent application Ser. No. 16/452,026, filed on Jun. 25, 2019, now issued as U.S. Pat. No. 11,427,349, which is a continuation of U.S. patent application Ser. No. 15/339,810, filed on Oct. 31, 2016, now issued as U.S. Pat. No. 10,370,118, which claims the benefit of priority to U.S. Provisional Patent Application Ser. No. 62/249,252, filed on Oct. 31, 2015, each of which is incorporated by reference in its entirety.

BACKGROUND OF THE INVENTION

1. Field of the Invention

This invention relates to using Light Emitting Diodes (LED) lights with remote controlled devices.

2. Description of Related Art

Prior to the present invention, remote controlled devices or drones used and employed lights and cameras; however, none used a combination of lights (typically LED-type lights) in a cycling motion and software that is reactive to sound to create the effect of writing words in the air and typically at nighttime against a dark sky. Prior devices simply turned lights on or off to mimic independent movement.

From the preceding descriptions, it is apparent that the devices currently being used have significant disadvantages. Thus, important aspects of the technology used in the field of invention remain amenable to useful refinement.

SUMMARY OF THE INVENTION

There is a remote control flying device or drone, which has software algorithms and a combination of lights or LED on an lighting ring or apparatus that can move independently of the drone; the drone can be programmed or be reactive to sound or other stimulus (light, motion, temperature) to create the effect of writing shapes or words in the air and typically at nighttime against a dark sky.

An apparatus for presenting LED lighting on a drone, said drone having a drone frame, at least one drone motor and at least one rotating blade; a battery; a LED microcontroller; a wireless receiver; an electronic speed controller; a first flight controller; said apparatus for presenting LED lighting comprising:

the drone frame having a first drone frame arm and a second drone frame arm;
the first drone frame arm having an LED ring motor;
the second drone frame arm having a bearing;
a LED housing has at least one LED light and engages the drone frame arms via the bearing and the LED ring motor, whereby the bearing allows the LED Ring Motor to move the LED housing around an axis of the drone frame and independently of movement of the drone and wherein in low light conditions and when the LED housing is moving independently around the drone, the at least one LED light creates a persistence of vision such that the drone is invisible in relation to the at least one LED light.

The drone frame can have multiple arms; each arm can have at least one drone motor, the at least one rotating blade, servo or bearing. The LED housing can be translucent and circular, square rectangular or triangular in shape. The drone is wirelessly connected to a second flight controller or a ground control computing device, which is a computing device with wireless communication and audio and visual inputs and can direct the LED lights to activate, for the LED Ring Motor to active to move the LED housing and to operate the first flight controller of the drone. The additional flight controller can be a smartphone, tablet or laptop computer; the audio input is a microphone; the visual input can be a light or thermal heat sensor.

A method of creating a persistence of vision display using a drone, an apparatus for presenting LED lighting and a ground station computing device with a wireless communication system; said drone having a drone frame, at least one drone motor and at least one rotating blade; a battery; a LED microcontroller; a wireless receiver; an electronic speed controller; a first flight controller; said apparatus for presenting LED lighting comprising:

the drone frame having a first drone frame arm and a second drone frame arm;
the first drone frame arm having an LED ring motor;
the second drone frame arm having a bearing;
a LED housing has at least one LED light and engages the drone frame arms via the bearing and the LED ring motor, whereby the bearing allows the LED Ring Motor to move the LED housing around an axis of the drone frame and independently of movement of the drone, comprising the following steps:
a. Activating the drone;
b. Signaling for the ground station computing device;
c. If the ground station computing device communicates with the drone and the LED microcontroller and transmits wireless instructions to the drone and the LED microcontroller to activate and adjust the at least one LED light and the LED housing and position of the drone.
d. If the ground station computing device does not communicate with the drone and the LED microcontroller, the drone and the LED microcontroller commences a pre-programmed light pattern and drone movement, whereby the at least one LED light and the LED housing create the persistence of vision display to a viewer.

The present invention introduces such refinements. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIGS. 5a and 5b show flowcharts of one embodiment of the algorithm for the "Hoop Drone" or "Persistence of Vision Communication" system.

FIGS. 6a and 6b show flowcharts of one embodiment of the algorithm for the "Hoop Drone" or "Persistence of Vision Communication" system, namely the Ground Station algorithm or software.

PARTS LIST

Figure 1:
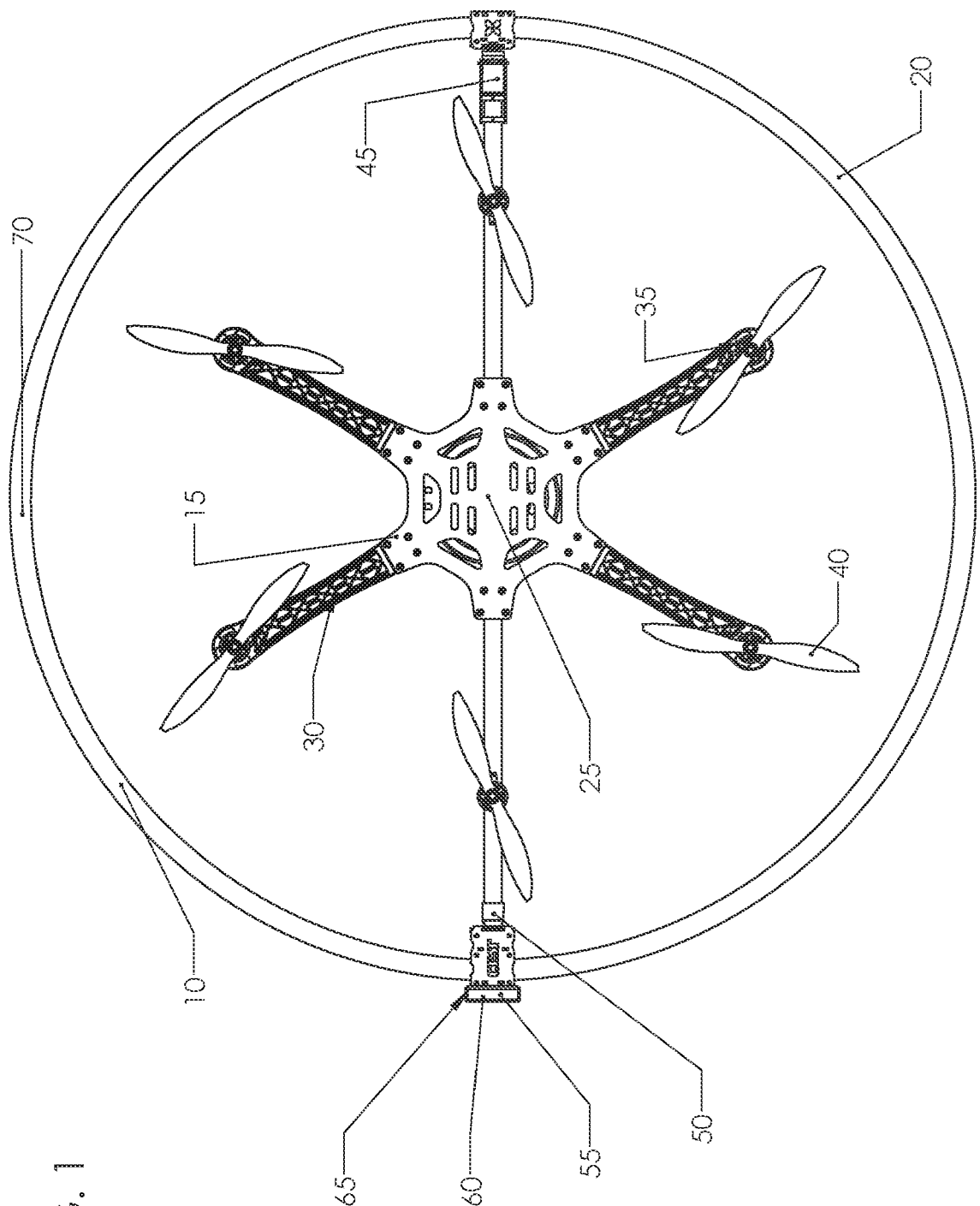
FIG. 1-4 show various views of one embodiment of the invention, which shows an overview of the rotating light apparatus on the drone.
Figure 2:
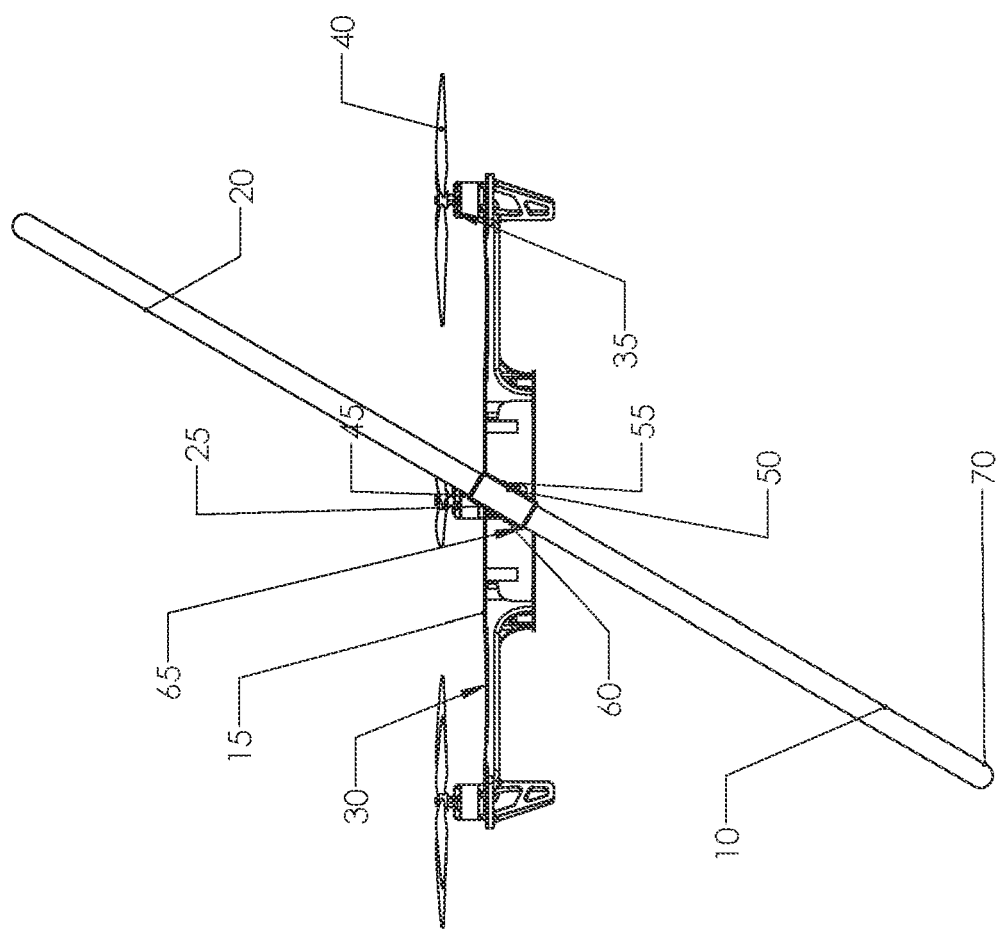
Figure 3:
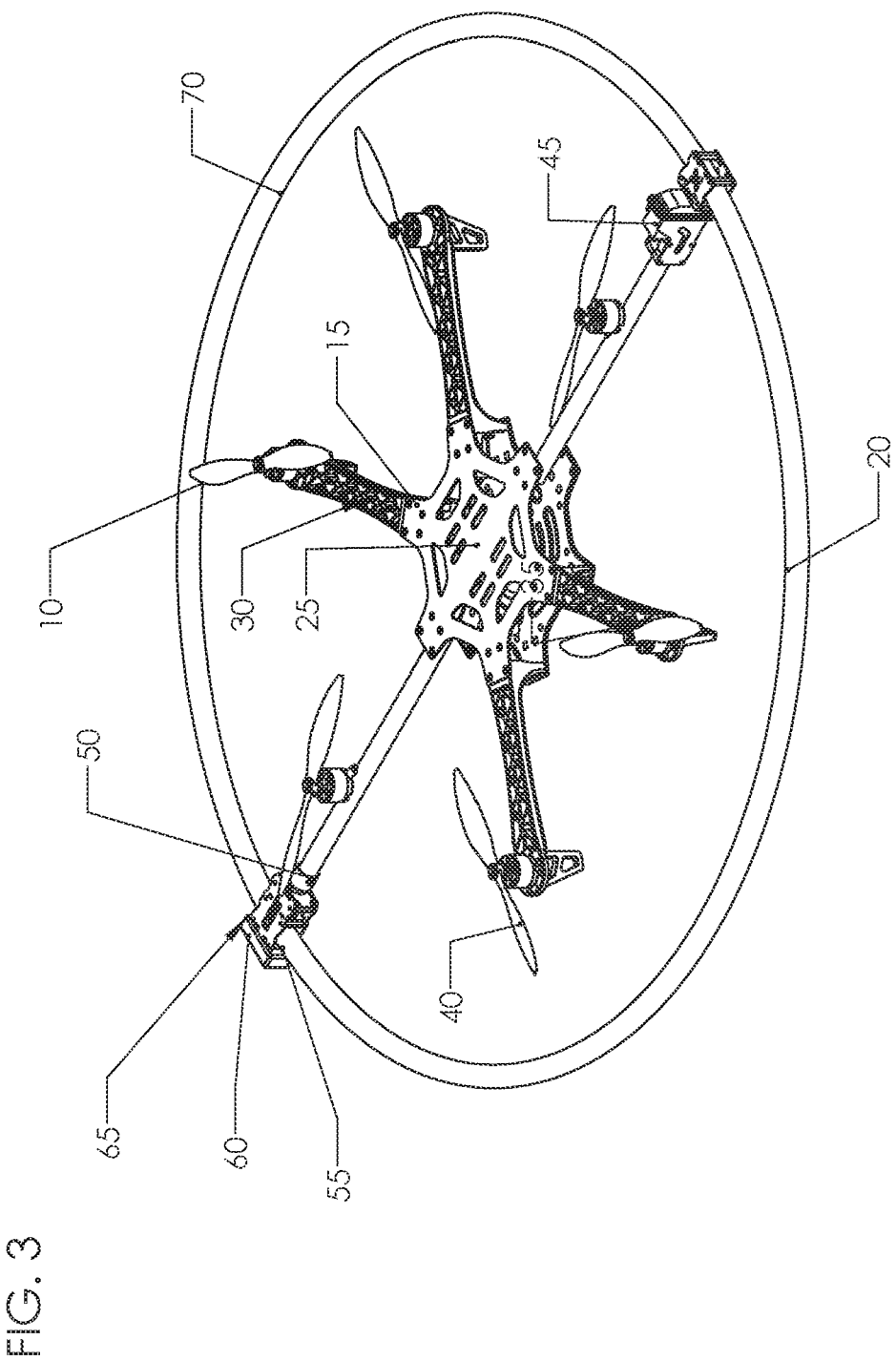
Figure 4:
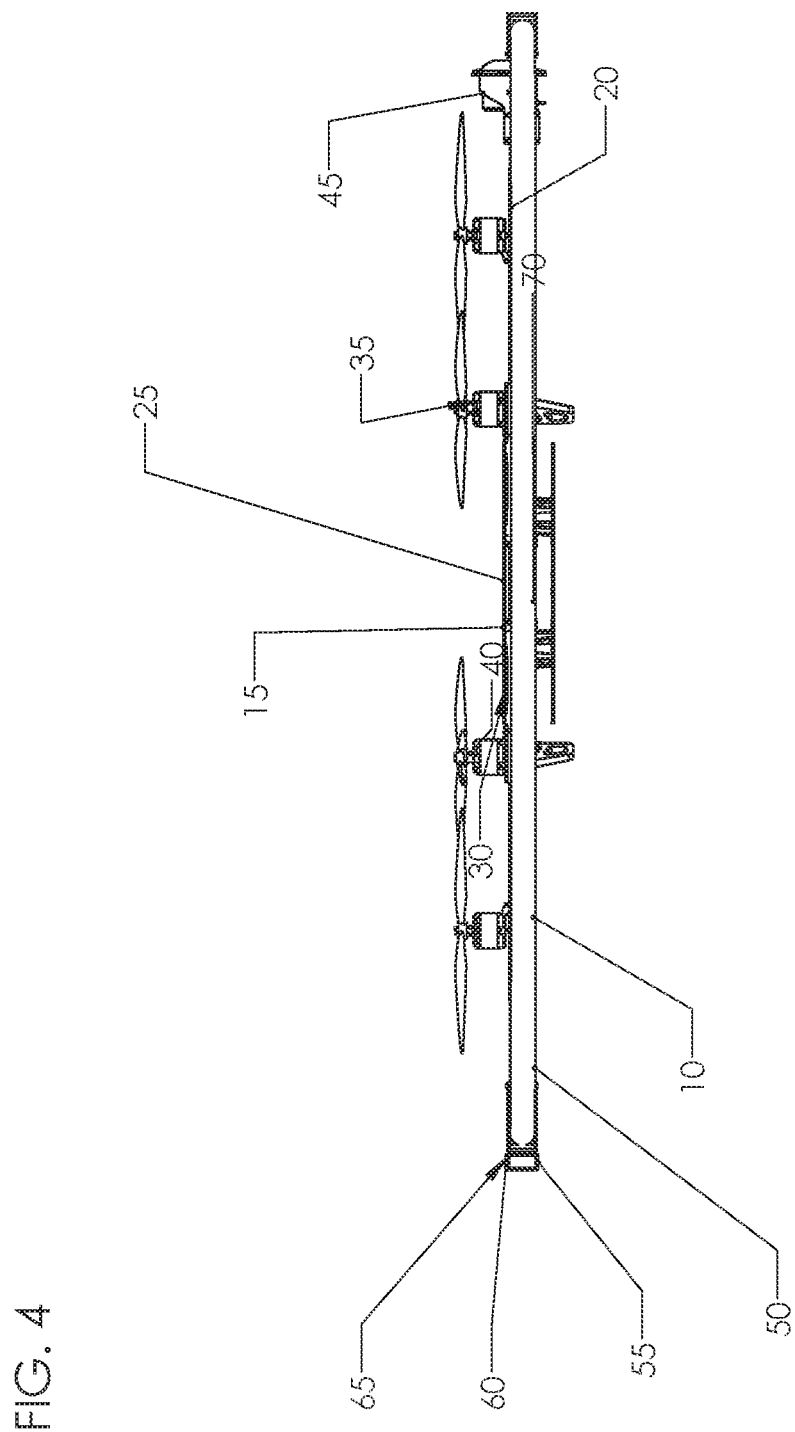

- 10 Apparatus
- 15 Frame for Drone
- 20 Outer Ring for LED; LED housing
- 25 Flight Controller
- 30 ESC
- 35 Drone Motor
- 40 Propeller
- 45 LED Ring Motor
- 50 Bearing or Servo
- 55 Battery
- 60 Microcontroller; LED microcontroller computing device
- 65 Wireless Receiver
- 70 LED light or light

DESCRIPTION OF THE PREFERRED EMBODIMENTS

The Basic Drone Apparatus includes without limitation: a drone frame or housing; at least one drone motor and at least one rotating blade or fan; a battery; a computing device or computing control device or flight controller; antenna; electronic speed controllers or sensors; stabilizers; gyroscope; altimeter; accelerometer and magnetometer; and a wireless receiver. The drone frame can have at least one or multiple arms, which each can have a drone motor and propeller; the drone frame and/or arms can also have lights or LED lights. Some of the electronic components or sensors can be combined into a computing device on the drone itself or be placed on different parts of the apparatus (LED housing, drone arms or drone frame). All of the electronics, LED lights, batteries on the drone or LED housing can be connected with wiring.

Lighting Apparatus Embodiment

One preferred embodiment of the invention presents a circular or ring shaped light mounting structure on the drone apparatus, which moves independently and separately from the drone itself. There is a moving frame or ring of LED lights; LED lights can be programmed to react to an external stimulus (sound, light, etc.) or a programmed stimulus (music, light pattern).

Separate motors, servos and bearings allow the light mounting apparatus on the drone apparatus to spin or to move independently from the drone itself. This invention employs software programs and algorithms to activate said lights and the drone apparatus. RF is radio frequency or any other wireless communication format; laptop refers to any computing device, including Smart Phone, laptop, tablet, notebook or any other mobile or desktop computing device.

Lighting or LED Housing

The drone frame can have multiple drone arms, including a first drone frame arm and a second drone frame arm. The first and the second drone arms can be connected to the lighting or LED housing. The first or second drone arms can have at least one or more LED frame motors, servos or bearings.

The LED housing has at least one LED light and engages the drone frame arms via the bearing and the LED ring motor, whereby the bearing allows the LED Ring Motor to move the LED housing around an axis of the drone frame and independently of movement of the drone. LED lights can be various colors: white, red, blue, etc.

The housing can be made of any lightweight plastic material, including clear, transparent or opaque colors; the housing can be hollow, a rail or track (upon which the LED lights are disposed. The LED housing can be circular, square rectangular or triangular or any variable shape.

Wireless Connection and Control

In one preferred embodiment, the applicants employ a wireless control of not only the drone's flying motors and flight system, but also the LED lights, including without limitation use of a wireless Arduino LED Control system.

In low light conditions and when the LED housing is moving independently around the drone, the at least one LED light or lights on the rotating LED housing create a persistence of vision such that the drone is generally or basically shadowed or invisible in relation to the at least one LED light or lights. The display of a rapidly rotating LED light housing around a stationary or moving drone creates a visually stimulating and pleasing sight.

The drone can be wirelessly connected to a second flight controller, which is a computing device with audio and visual inputs and can direct the LED lights to activate, for the LED Ring Motor to active to move the LED housing and to operate the first flight controller of the drone. Typical wireless communication is RF but can also include without limitation other wireless protocols: Bluetooth, WIFI, Satellite and cellular network communications.

The second flight controller can also be a Smartphone, tablet or laptop computer; the audio input can be a microphone; the visual input can be a light sensor or another type of electronic eye; other potential sensors could include heat and thermal sensors and GPS or position sensors.

a. Programmed to React to Stimuli (Music or Light, Etc.)

Figure 7:
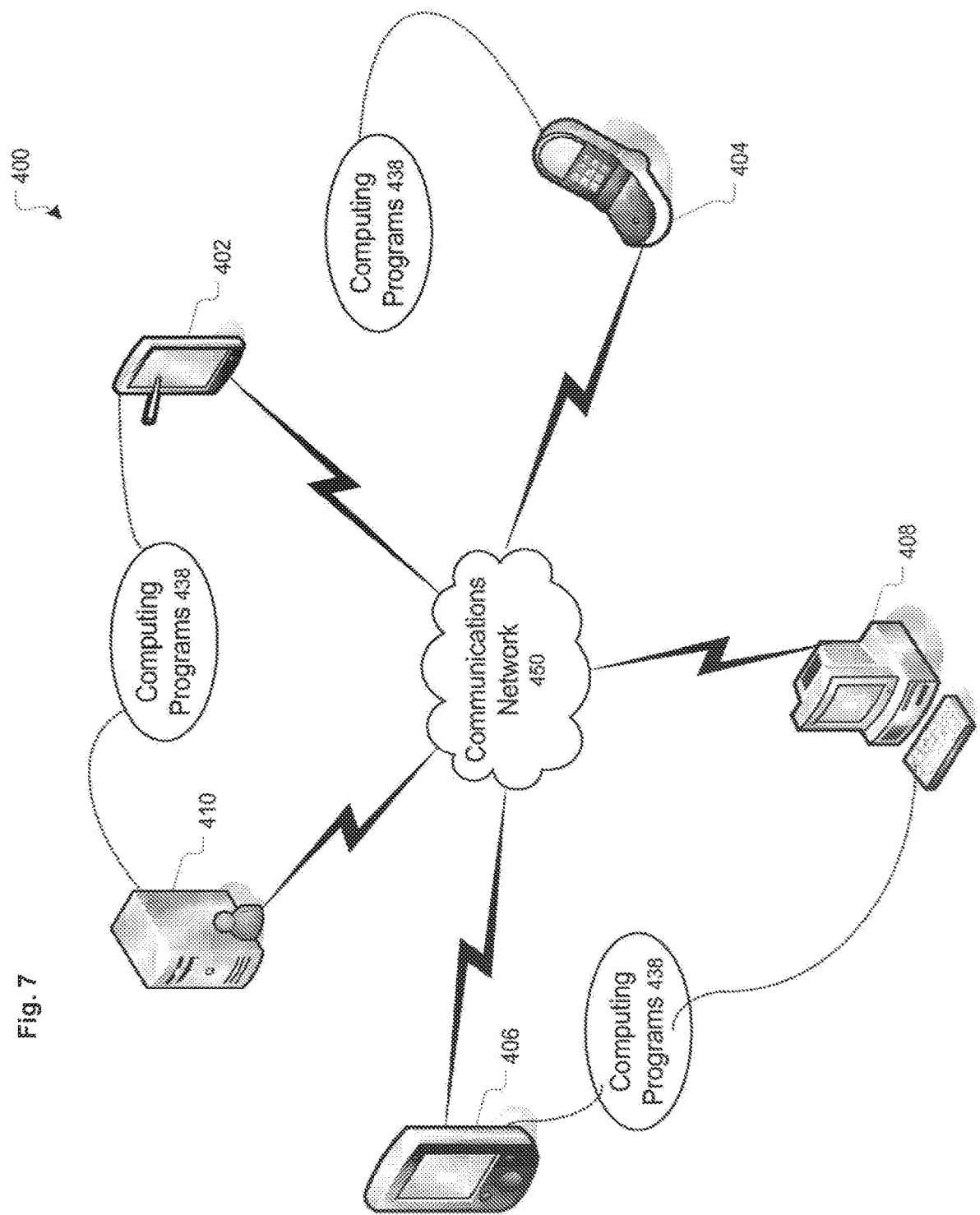
FIG. 7 shows a diagram of a system suitable for computing programs and the Internet or other wireless communication systems.

In FIG. 5-7, when the drone is wirelessly connected to a controlling computing device, a wirelessly connected ground station (with a computing device, memory and input (microphone or other input sensors)) can direct the lights to turn/on off, for the light apparatus to move and to rotate and finally for the drone to react to this stimulus or input. The movement of the drone and the lights can be independent of one another.

When not connected to a controlling computing device; hardware on the drone can have pre-built ore pre-programmed patterns for movement of the drone and activation/deactivation of the LED lights and rotation or spinning of the LED housing around the drone frame.

b. Non-Programmed Stimulus:

In FIG. 5-7, a controlling computing device (Smart Phone, tablet or laptop computer) or ground station can use the input sensor (including without limitation: a microphone or light sensor) to react to the external or non-programmed stimulus; this wirelessly connected ground station (with a computing device, memory and input (microphone or other input sensors)) can direct the lights to turn/on off, for the light apparatus to move and to rotate and/or for the drone to react to this stimulus or input.

In one preferred embodiment, the controlling computing device uses its microphone to listen to external music or other stimulus—this will turn the LED "on" or "off" or make the LED light apparatus to move or to make the drone change its position.

The apparatus also allows the human operator to change the LED light activation, sequence of activation, LED light apparatus movement and the drone movement.

c. Persistence of Vision:

In FIG. 5-7, the movement of the drone and the lights can be independent of one another; the drone can remain stationary, but the lights and light structures can be moving and actuated. Since the light mounting ring or LED housing is at the furthest part of the periphery of the drone, the light mounting structure can block or cloak the drone apparatus from view.

This invention relates to remote control device or drone, which has a combination of lights (typically LED-type lights) in a cycling motion and software that is reactive to sound to create the effect of writing words in the air and typically at nighttime against a dark sky.

Persistence of Vision can be defined as the retention of a visual image for a short period of time after the removal of the stimulus that produced it; the phenomenon that produces the illusion of movement when viewing motion pictures.

This invention refers to computing programs, applications or software, which are all synonymous and are used interchangeably. This invention can be applied to any computing device that can be connected to a communication network or the Internet via wire or wireless connection. The embodiments of the invention may be implemented by a processor-based computer system. The system includes a database for receiving and storing information from users and application software for users, among other things, determining or updating usage, lifestyle characteristics, values and a user's profile, and displaying feedback information, in accordance with the present invention, computer system operates to execute the functionality for server component. A computer system includes: a processor, a memory and disk storage. Memory stores computer program instructions and data. Processor executes the program instructions or software, and processes the data stored in memory. Disk storage stores data to be transferred to and from memory; disk storage can be used to store data that is typically stored in the database.

All these elements are interconnected by one or more buses, which allow data to be intercommunicated between the elements. Memory can be accessible by processor over a bus and includes an operating system, a program partition and a data partition. The program partition stores and allows execution by processor of program instructions that implement the functions of each respective system described herein. The data partition is accessible by processor and stores data used during the execution of program instructions.

For purposes of this application, memory and disk are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, light wave signals, radio-frequency (RF) signals and any other device or signal that can store digital information. In one embodiment, the instructions are stored on the medium in a compressed and/or encrypted format.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. The terms "a" or "an", as used herein, are defined as: "one" or "more than one." The term plurality, as used herein, is defined as: "two" or "more than two." The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any section or paragraph headings are for the organization of the application and are not intended to be limiting. Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

Incorporation by Reference: All publications, patents, and patent applications mentioned in this specification are herein incorporated by reference to the same extent as if each individual publication, patent, or patent application was specifically and individually indicated to be incorporated by reference: U.S. Pat. No. 8,667,533; US 2005/0005025; U.S. Pat. Nos. 9,162,753; 8,903,568; 7,302,316; 7,195,200; 9,134,534; 9,129,295; 9,128,281; 9,097,891; 9,097,890; 9,061,102; 9,055,226; 9,017,123; 9,014,661; 9,010,261; 8,989,053; 8,964,298; 8,857,191; 8,854,594; 8,814,691; 8,596,036; 8,549,833; 8,488,246; 8,482,589; 8,477,425; 8,472,120; 8,468,244; 8,467,133; 8,291,716; 8,109,073; 8,099,944; 7,973,658; 7,773,204; 7,750,802; 6,949,003; 6,333,726.

What is claimed is:

1. A method comprising:
controlling remotely operated flight of an aerial drone using flight systems carried by a frame of the aerial drone, the aerial drone having an integrated display mechanism that is configured to produce, via in-flight light emission, a visual display for ground-level audiences; and
using an on-board control system comprising one or more computer processor devices incorporated in the aerial drone and configured to enable, via wireless instructions from a remote computing device, remote control of drone movement and remote control of the display mechanism, performing automated control operations comprising:
responsive to receiving control instructions from the remote computing device, controlling the aerial drone to produce a particular visual display according to the received control instructions; and
responsive to determining that the remote computing device is not in communication with the on-board control system, automatically controlling the aerial drone to perform a pre-programmed visual display and to execute a pre-programmed flight pattern.

2. The method of claim 1, wherein the display mechanism comprises a display member mounted on the frame such as to be rotatable about a rotational axis that intersects the frame, the display member carrying an array of light emitters that is mounted on the display member and that is configured to provide a persistence of vision display during driven rotation of the display member.

3. The method of claim 2, wherein the display member is mounted on the frame such that, during rotation of the display member, the frame and the flight systems are located within a volume bounded by the rotating display member.

4. The method of claim 2, wherein the display member is translucent.

5. The method of claim 2, wherein the display member is circular in shape, the rotational axis extending diametrically across the display member.

6. The method of claim 2, wherein the display member is quadrangular in shape.

7. The method of claim 2, wherein a body of the drone includes:
the frame of the aerial drone, said frame carrying a drone motor that powers the flight systems; and
a pair of cantilever arms projecting radially from the frame to diametrically opposite sides thereof,
wherein the display member is rotatably mounted on the pair of cantilever arms at respective points on opposite sides of the frame.

8. The method of claim 7, wherein the display member is a display ring centered on the frame, the pair of cantilever arms projecting diametrically across the display ring.

9. The method of claim 7, wherein driven rotation of the display member is via a drive mechanism that comprises a display motor mounted on one of the pair of cantilever arms at a rotatable joint between the display member and said cantilever arm.

10. The method of claim 2, wherein the display mechanism further comprises a drive mechanism configured to drivingly rotate the display member about the rotational axis.

11. The method of claim 10, wherein the array of light emitters comprises a series of light emitting diodes (LEDs) mounted on the display member.

12. An aerial drone comprising:
a frame;
flight systems carried by the frame to enable flight of the aerial drone;
a display mechanism that is carried by the frame and that is configured to produce in-flight visual displays for ground-level audiences; and
an on-board control system configured to enable remote control of visual display by the aerial drone via wireless instructions from a remote computing device, wherein the on-board control system is further configured to perform operations comprising:
responsive to receiving control instructions from the remote computing device, controlling the aerial drone to produce a visual display via the display mechanism according to the received control instructions; and
responsive to determining that the remote computing device is not in communication with the on-board control system of the aerial drone, automatically controlling the aerial drone to perform a pre-programmed visual display and pre-programmed drone movement.

13. The aerial drone of claim 12, wherein the on-board control system is configured to control production of the pre-programmed visual display by controlling both drone movement and operation of the display mechanism.

14. The aerial drone of claim 12, wherein the on-board control system is configured such that production of the pre-programmed visual display includes pre-programmed movement of the aerial drone.

15. The aerial drone of claim 12, wherein the display mechanism comprises an array of light emitters.

16. The aerial drone of claim 15, wherein the on-board control system and the display mechanism are configured to produce persistence of vision visual displays.

17. The aerial drone of claim 16, wherein the display mechanism comprises a display member mounted on the frame such as to be rotatable about a rotational axis that intersects the frame, the array of light emitters being mounted on the display member to provide a persistence of vision display during driven rotation of the display member.

18. The aerial drone of claim 17, wherein the array of light emitters comprises a series of light emitting diodes (LEDs) mounted on the display member.

19. The aerial drone of claim 17, wherein a body of the aerial drone includes:
the frame of the aerial drone, said frame carrying a drone motor that powers the flight systems; and
a pair of cantilever arms projecting radially from the frame to diametrically opposite sides thereof, the display member being rotatably connected to the pair of cantilever arms at respective points on opposite sides of the frame.

* * * * *